US006200217B1

(12) United States Patent
Osawa

(10) Patent No.: US 6,200,217 B1
(45) Date of Patent: Mar. 13, 2001

(54) GAME MACHINE

(75) Inventor: Akira Osawa, Tokyo (JP)

(73) Assignee: Aruze Corporation, Tokyo (JP)

(*) Notice: Subject to any disclaimer, the term of this patent is extended or adjusted under 35 U.S.C. 154(b) by 0 days.

(21) Appl. No.: 09/261,631

(22) Filed: Mar. 3, 1999

(30) Foreign Application Priority Data

Mar. 4, 1998 (JP) ..................... 10-051832

(51) Int. Cl.[7] ..................... A63F 13/00

(52) U.S. Cl. ..................... 463/20; 273/143 R

(58) Field of Search ..................... 273/138.1, 143 R, 273/143 A, 138.2; 463/16, 20, 21, 22

(56) References Cited

U.S. PATENT DOCUMENTS 4,721,307 * 1/1988 Okada ..................... 273/143
5,580,053 * 12/1996 Crouch ..................... 273/138 A
5,609,524 * 3/1997 Inoue ..................... 463/20
5,704,835 * 1/1998 Dietz, II ..................... 463/20
5,807,172 * 9/1998 Piechowiak ..................... 463/20
6,106,393 * 8/2000 Sunaga ..................... 463/20

* cited by examiner

*Primary Examiner*—Jessica J. Harrison
*Assistant Examiner*—Scott E. Jones
(74) *Attorney, Agent, or Firm*—Hutchins, Wheeler & Dittmar

(57) ABSTRACT

Provided is a slot machine which determines a prize situation depending on a combination of symbols to be displayed on effective lines. The position of the effective lines is variable and is determined by sampling a random number.

9 Claims, 5 Drawing Sheets

GAME MACHINE

BACKGROUND OF THE INVENTION

1. Field of the Invention

The present invention relates to a game machine in which a prize situation is determined, depending upon a combination of symbols, and in particular to a slot machine which is characterized by a way of displaying a prize situation.

2. Description of the Prior Arts

Heretofore, there have in general been widely used slot machines as game machines which pay out medals such as coins, depending upon a prize situation as a result of a game. Explanation will now be made of a slot machine by way of an example.

After a player inserts a medal into a slot machine, the player manipulates a start lever to start a game. In the slot machine, a plurality (for example, three) of reels each having several kinds of symbols arranged at the outer peripheral edge thereof, are rotated at a high speed, and a prize situation is determined, depending upon a combination of symbols on the reels, which come to predetermined window positions when the rotation of the reels is stopped. Further, a combination of symbols, that is, a prize configuration when these reels being stopped, determines a number of medals to be paid out.

Among prizes in the slot machine, there may be a "big prize" in which more than 1,000 medals are paid out, a "small prize" in which less than 1,000 medals are paid out, a "second game gain" in which a second game as a subgame can be enjoyed and so forth.

Next, explanation will be hereinbelow made of the so-called "second game gain".

A game by which "a big prize", "a small prize", a second game gain or the like can be obtained will be referred to as "a first game". In the first game, if the "second game gain" can be obtained, a second game can be carried out without inserting a new medal. This second game is carried out under a rule different from that of the first game, and is in general called as, for example, "a bonus game" or "a free game". This second game is in general advantageous for the player. That is, the player can gain a large number of medals in accordance with a result of the second game.

By the way, among slot machines which are worldwide used, there is the one in which a center horizontal line is fixedly formed, serving as an effective line for indicating a prize in a window through which the player sees symbols. That is, a prize situation is determined, depending upon a combination of symbols which come onto this fixed effective line when reels come to a stop after they are rotated.

Further, in the slot machine of such a type, there are parts having no symbols (which will be referred to as "blanks"), among the symbols. The three reels are rotated successively in order, for example, rightward. If the leftmost one of the reels comes to a stop so that a blank thereon comes onto the effective line, it is concluded that the game is failed at that time. Accordingly, the player would soon know that no medal can be obtained as a result of a game at the time when only one of the three reels comes to a stop, and accordingly, the player would lose interest in the present game shortly. This is because of the effective line which is fixed and which has been beforehand known as to where it is.

Further, there is a slot machine of another type in which a number of effective lines is increased, depending upon a number of medals to be bet in a game. For example, in a game in which a single medal is bet, only a center horizontal line serves as an effective line, but in a game in which two medals are bet, the center horizontal line and two lines above and below the center horizontal line, that is, three lines in total, serve as effective lines.

However, even in a game machine of such a type wherein the number of effective lines increases, the positions of effective lines in the game are stationary and can be known. Accordingly, the player can anticipate a result of the game before all three reels come to a stop. Thus, there has been a problem in that the game is simple and plain.

SUMMARY OF THE INVENTION

The present invention has been made in view of the above-mentioned problem. Accordingly it is an object of the present invention to provide a slot machine with which a player can hold his interest in a game until the game is over, and can enhance his interest in the game so as to concentrate his attention on the game.

To thus end, according to a first aspect of the present invention, there is provided a game machine in which a prize situation is determined, depending upon a combination of symbols indicated on an effective line, characterized in that a position where the effective line is set, is variable and is to be determined by sampling a random number.

According to a second aspect of the present invention, there is provided a game machine in which a prize situation is determined, depending upon a combination of symbols indicated on an effective line, characterized in that a number of effective lines is variable and is to be determined by sampling a random number.

According to a third aspect of the present invention, there is provided a game machine in which a prize situation is determined, depending upon a combination of symbols indicated on an effective line, characterized in that both a position where the effective line is set and a number of effective lines are variable and are to be determined by sampling a random number.

Further, in a game machine as set forth in any one of claims 1 to 3, the effective line which has been determined by sampling a random number, is indicated by energizing light emitting means provided in the vicinity of the effective line.

Further, in a game machine as set forth in claim 4, the light emitting means is a lamp.

Further, in a game machine as set forth in any of claims 1 to 3, the effective lines are formed by EL lamps, and an effective line determined by sampling a random number is indicated by energizing the EL lamps.

Further, in a game machine as set forth in any one of claims 1 to 6, the sampling of a random number is carried out for every game.

DETAILED DESCRIPTION OF THE PREFERRED EMBODIMENTS

Figure 1:
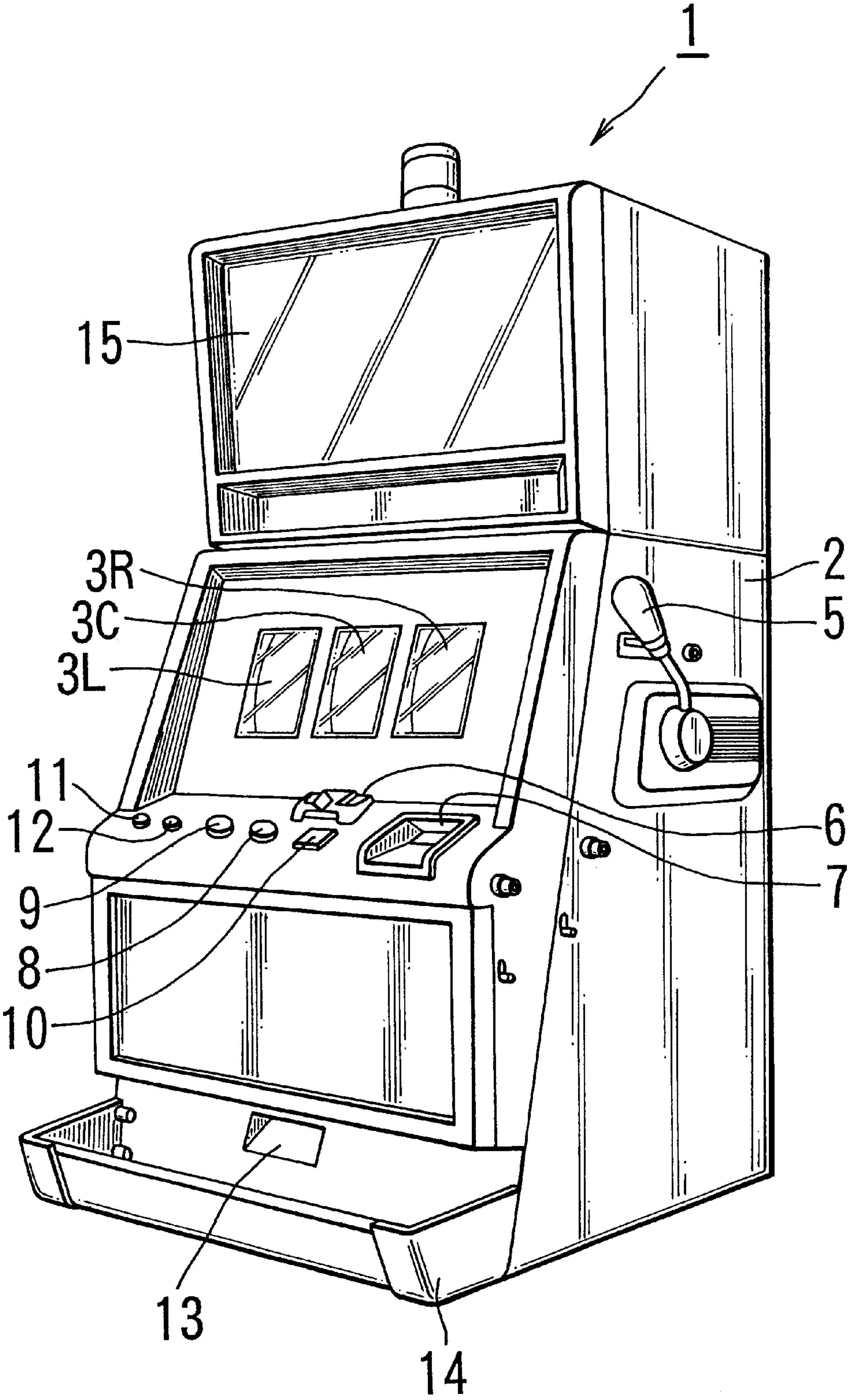
FIG. 1 is a perspective view illustrating a slot machine in an embodiment of the present invention.

Referring to FIG. 1 which is a perspective view illustrating a slot machine in an embodiment of the present invention, there is shown a slot machine 1. A cabinet 2 constitutes the slot machine 1 in its entirety, having a front surface part in which windows 3L, 3C, 3R for observing symbols on a plurality of reels which are provided in the cabinet 2 and which are not shown, respectively therethrough, by a number corresponding to the number of the reels (three in the case shown in FIG. 1). Further, a side surface is attached thereto with a start lever 5 which is adapted to be manipulated by a player for rotating the reels, and which is rotatable over a predetermined angle range is provided on a side surface of the cabinet 2.

In the front surface of the cabinet 2, below the windows 3L, 3C and 3R, there are provided a medal insertion slot 6 for inserting a medal to be bet on a game, a bill insertion slot 7 for inserting a bill for credit reserve, a spin switch 8 for starting the reels through manipulation of a push button, in addition to manipulation of the start lever, a 1-BET switch 9 may be used for betting only one of medals credited through single manipulation of a push button, a maximum BET switch 10 for an allowable maximum number of medals can be bet for a single game through single manipulation of a push button, a change button 11 for calling a person in charge through manipulation of a push button, and a pay-out button 12 which can change over a play credit/pay-out gained by a player through manipulation of a push button, and which can pay out credited medals.

In order to start a game, that is, in order to rotate the reels, the start lever 5 or the spin switch 8 is manipulated, or alternatively, the maximum BET switch 10 is manipulated. It is noted that a game starting function which can be effected by manipulating the maximum BET switch 10 can be energized or deenergized by initial setting in the slot machine body.

In the lower part of the slot machine 1, there are provided a medal pay-out port 13 for paying out medals, and a medal receiver 14 for reserving medals paid out from the medal pay-out port 13. It is noted that a dividend display panel 15 on which combinations of symbols in prize, and a dividend table are labeled, is provided in the upper part of the front surface of the machine 1.

Figure 2:
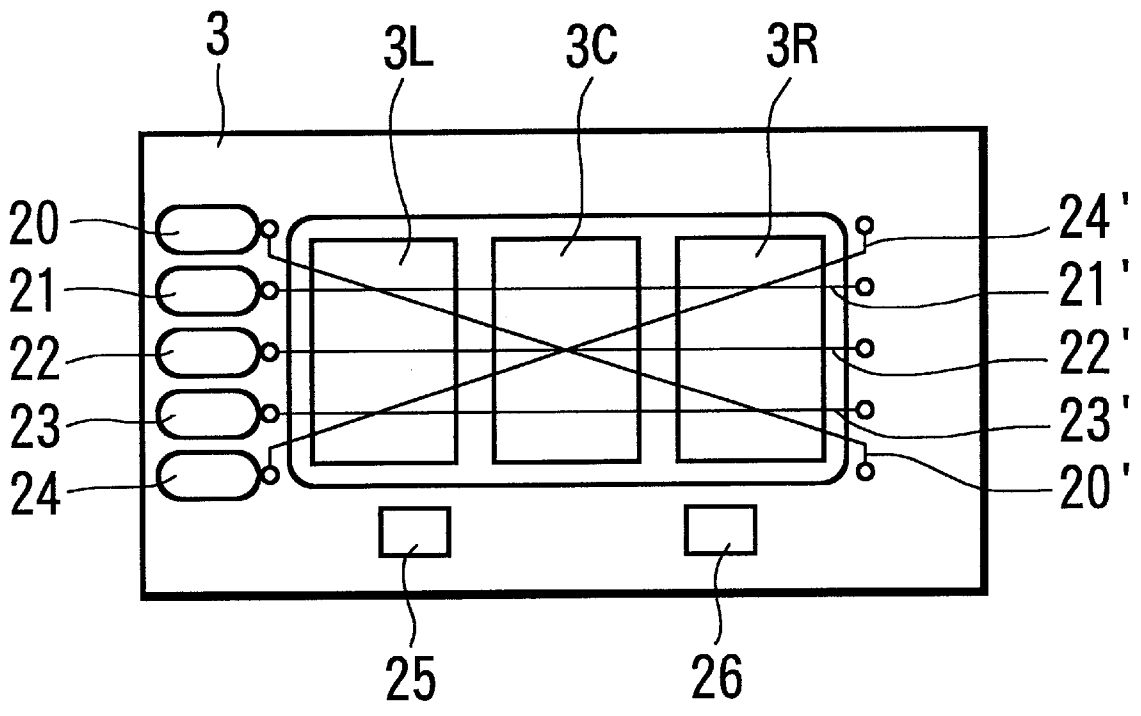
FIG. 2 is an external view illustrating, in detail, reel observing windows of the slot machine shown in FIG. 1.

FIG. 2 is an external view which shows in detail an example of the reel observing windows of the slot machine shown in FIG. 1.

In the slot machine in this embodiment, a single effective line is set, irrespective of a number of medals to be inserted (to be betted on a game) before a start of a game, and a position of the effective line is determined by sampling a random number for every game. That is, it is not in such a case as the larger the number of medals to be bet for each game, the larger the number of games, that is, a number of medals to be bet for each game affects a dividend upon winning.

In this embodiment, three windows 3L, 3C and 3R are formed on the outer surface of a glass base board 3, through which three symbols can be seen, respectively.

Referring to FIG. 2, there are shown light emitting means 20 to 24 for indicating which one of lines 20' to 24' is an effective line. These emitting means 20 to 24 are composed of lamps provided on the rear side of the glass base board 3. Light emitted from these lamps 20 to 24, is transmitted to the player through the glass base board 3. When only a lamp 20 among the lamps 20 to 24 are turned on, only a diagonal line 20' downward slanting to the right becomes an effective line. When only a lamp 21 is turned on, only an uppermost line 21' becomes an effective line. When only a lamp 22 is turned on, only an intermediate line 22' becomes an effective line. Further, when only a lamp 23 is turned on, only a lowermost line 23' become an effective line. When a lamp 24 is turned on, a diagonal line 24' upward slanting to the right becomes an effective line.

Also shown are a credit number display 25 for displaying a number of credited medals, and a gained number display 26 for displaying a number of medals gained in a game carried out at the present time.

Figure 3:
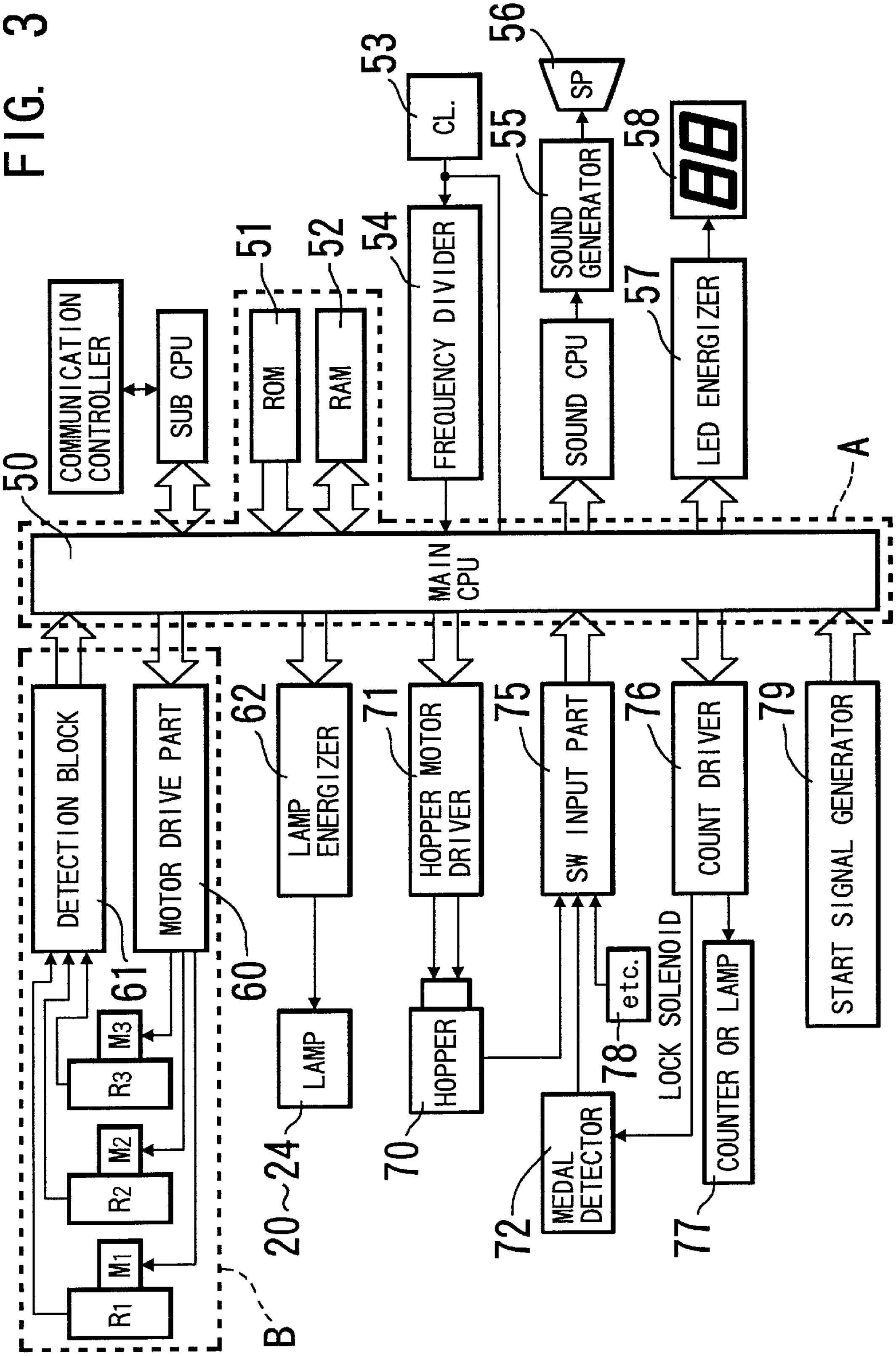
FIG. 3 is a block diagram illustrating a microcomputer part for controlling the slot machine shown in FIG. 1.

Referring to FIG. 3, shown is a block diagram illustrating a microcomputer part for controlling the slot machine in this embodiment. A broken line block A shows a main control part composed of a main CPU 50, a ROM 51 and a RAM 52. The ROM stores therein a coordinate table for symbols and symbol codes, a table for listing symbol codes corresponding to prizes, and numbers of prize medals to be paid out, a table for listing probabilities for prize situations with respect to a game carried out, and a coordinate table for those of lamps 20–24 to be turned on 20 to 24 and random numbers. The RAM 52 is composed of a random number storage for temporarily storing therein random numbers to be sampled after a start of a game, a memory for temporarily storing therein data such as reel code numbers or symbol numbers, and the like.

A clock pulse generator 53 generates, for example, 4 MHz pulses as reference pulses for operating the main CPU 50, and a frequency divider 54 delivers, for example, 500 Hz interrupting pulses to the main CPU 50 in order to execute a process of interruption of a given program. A sound generator 55 is adapted to be energized so as to generate sounds from a speaker 56 in order to arouse interest in a game at a suitable time. That is, it can be used as a play effecting means which will be explained later. An LED energizer 57 for energizing light emitting diodes 58 in the form of, for example, seven segment digital display, is used as the credit number display 25 and the gained number display 26.

Further, a broken line block B shows a reel drive monitor. In this embodiment, reels R1, R2 and R3 are driven by pulse motors M1, M2 and M3, respectively. The motors M1 to M3 are rotated by drive pulses delivered from a motor driver 60 so as to rotate the reels in such a way that symbols on the reels which can be seen through the windows 3L, 3C and 3R are shifted by one by each single pulse. Further, the reels are arranged so as to generate a reset signal per every revolution thereof. A detection block 61 detects this reset signal. The main CPU 50 counts a number of drive pulses delivered to the motors after the detection block 61 detects a reset signal, and accordingly, symbols on the reels, which can be seen through the windows 3L, 3C and 3R can be specified.

Further, a lamp energizer 62 selectively turns on the lamps 20 to 24 under instructions from the main CPU 50.

Further, there are shown a prize medal pay-out hopper 70, a hopper motor driver 71, a medal detector 72 for detecting insertion of a medal, prior to a start of a game. A signal indicating a number of inserted medals, delivered from the medal detector 72 is delivered together with a signal indicating a number of paid-out medals, delivered from the hopper 70 is transmitted to a counter or a lamp 77 from a counter driver 76 through an sw input 75 and the main CPU 50 in order to detect numbers of inserted medals and paid-out medals, or to turn on indication lamps on a prize effective line in accordance with a number of inserted medals. This fact can also be used as a stage effecting means which will be described later. It is noted that a lock solenoid for locking the insertion of medals is energized when a number of inserted medals reaches to five.

Further, shown is another switch manipulating part 78 including an interrupting switch adapted to be manipulated such that a game is stopped after a medal is inserted, a start signal generator 79 composed of the start lever 5, the spin switch 8 or the maximum BET switch 10 as mentioned above.

According to the system arrangement mentioned above, a determination process relating to the progress of a game in a slot machine in this embodiment can be carried out by a predetermined execution program executed by the main CPU 50.

Figure 4:
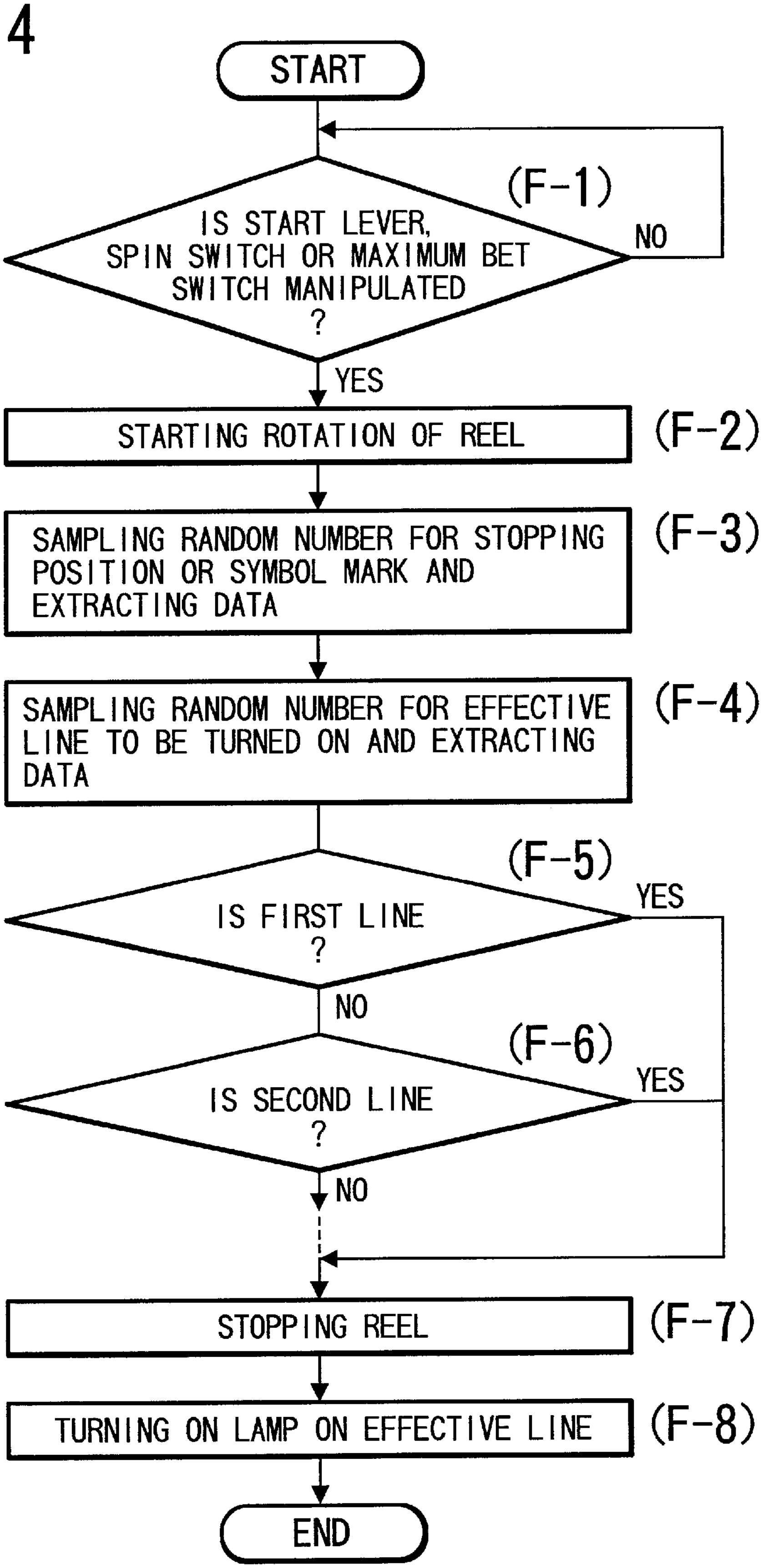
FIG. 4 is a flow-chart showing a progress of a game in the slot machine shown in FIG. 1, and an example of an operation carried out thereby.

FIG. 4 shows a flow-chart for explaining an example of the progress and operation of a game in the slot machine shown in FIG. 1.

In the slot machine, after a number of medals to be bet in the game is determined, the start lever 5 or the spin switch 8 is manipulated. Alternatively, the maximum BET switch 10 is manipulated (F-1). Thus, the game is started. That is, the rotation of the reels is started (F-2).

Next, random number sampling is carried out for stopping positions of the reels or symbols to be displayed through the windows, and data to be used for the present game are extracted (F-3). Further, random number sampling for turning on lamps in an effective line is carried out, and data to be used for the present game is extracted (F-4).

Thereafter, which a line number the data extracted at F-4 is used for, is determined (F-5, F-6). Further, the rotation of the reels is stopped (F-7) in accordance with data extracted at F-3, and thereafter, only lamps determined at steps (F-S) and (F-6) among the lamps 20 to 24 are turned on step (F-8). It is estimated here that for example, the line 24', the line 21', the line 22' and line 23' are first, second, third and fourth lines, respectively.

It is noted that all lamps 20 to 24 may be flashed, with turned on or turned off, during a period from the game start to the time of turning on lamps indicating an effective line.

In this embodiment, although it has been explained that any one of the five lines is used as an effective line, the invention should not be limited to this embodiment. A predetermined number of lines among the five lines may be used as effective lines. This example will be explained with reference to FIG. 5.

Figure 5:
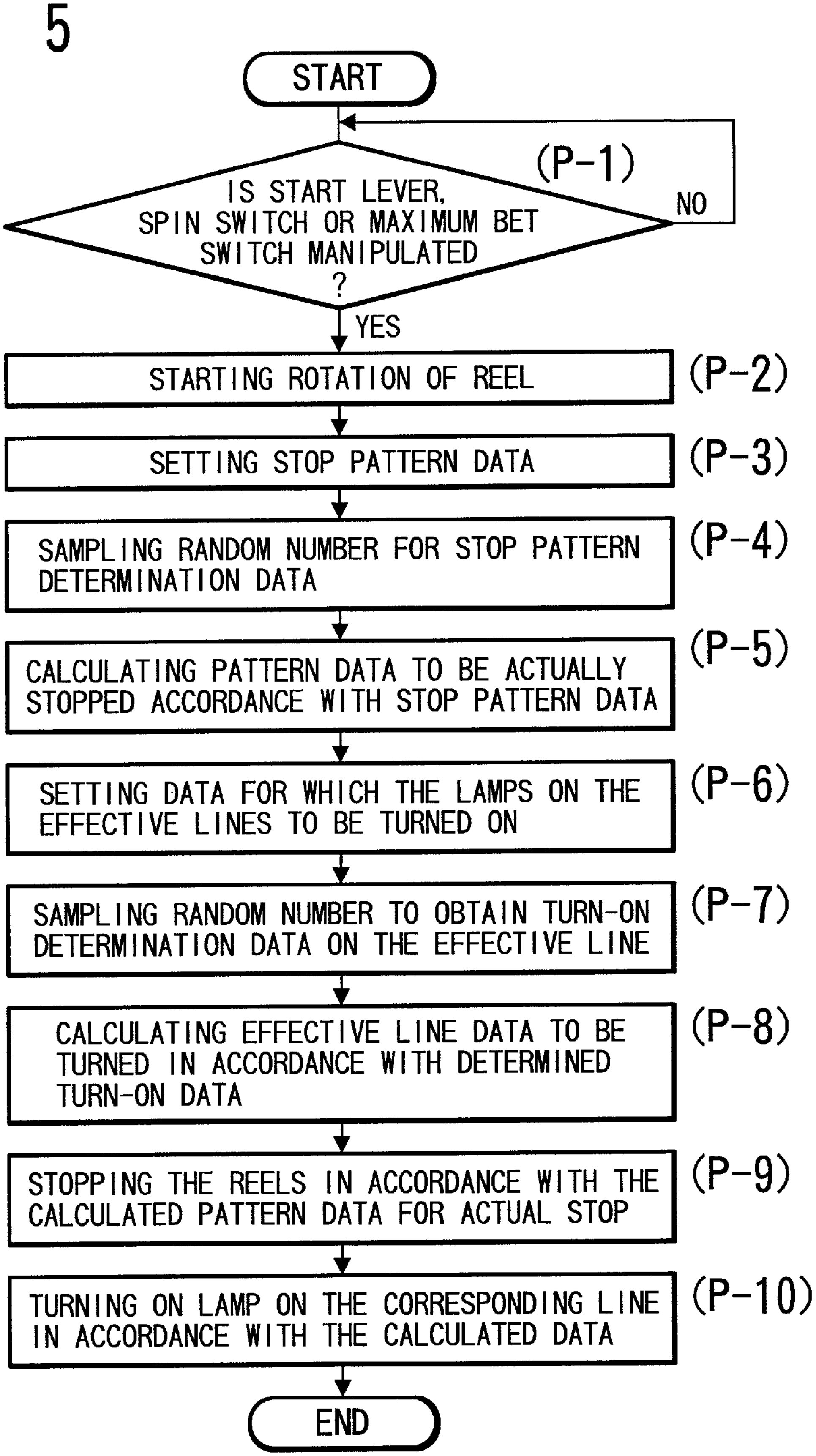
FIG. 5 is a flow-chart showing a progress of a game in the slot machine shown in FIG. 1, and another example of an operation carried out thereby.

FIG. 5 shows a flow-chart explaining an example of the progress and operation of a game in the slot machine shown in FIG. 1.

In this slot machine, after a number of medals bet on the game is determined, when the start lever 5 or the spin switch 8 is manipulated, or when the maximum BET switch 10 is manipulated (P-1), the game starts so that the rotation of the reels is started (P-2).

Next, pattern (symbol) data are read from the ROM 51 (P-3). Further, when the reels are stopped, patterns observed through the windows 3L, 3C and 3R are determined through random number sampling so as to obtain stop pattern determination data (P-4) from which pattern data to be actually stopped are calculated (P-5).

Next, line data are read from the ROM 51 (P-6). Further, a line corresponding to lamps to be turned on in the game is determined through the random number sampling so as to obtain turn-on determination data (P-7) from which data of a line corresponding to the lamps to be turned on is calculated (P-8). At this time, the number of lines on which the lamps are turned on is not always one. That is, positions of effective line and a number of the effective lines are selected through the sampling of a random number at step (P-7).

Finally, the reels are stopped (P-9) in accordance with the pattern data for an actual stop, which have been calculated at step (P-5). Thereafter, the lamps corresponding to the lines selected in accordance with data which have been calculated at step (P-8) are turned on (P-9).

It is noted that in such a case that the sampling of a random number for effective lines and the determination and indication (turn-on of lamps) of the effective lines are made after the rotation of all reels is stopped, the sampling of a random number for effective lines is carried out only when winning is obtained depending upon positions of the effective lines in order to smoothly perform the progress of a game. That is, in this case, if in the game is lost due to a combination of symbols even though the effective lines are set to any positions, a next game is started without sampling of a random number for the effective lines.

Further, although it has been explained that lamps indicating effective lines are turned on after all reels are stopped in the embodiments mentioned above, the present invention should not be limited to the embodiments. That is, the reels may be stopped after lamps indicating effective lines are turned on. Even in such a case that the reels are stopped after lamps indicating effective lines are turned on, it is possible to provide a slot machine which is fun for the player and with which the play can concentrate his attention upon a game. In addition, lamps for effective lines may be turned on one by one each time when each one of the reels is stopped.

Further, although it has been explained that lamps provided at one side of the windows 3L, 3C and 3R of the slot machine are turned on so as to indicate effective lines in the embodiments mentioned above, the present invention should not be limited to those embodiments. For example, lines crossing the windows 3L, 3C and 3R may be composed of EL (electroluminescent) lamps so that the lines themselves emit light, depending upon a result of the sampling of a random number.

Further, although explanation has been made of the slot machine in which the reels are rotated in the embodiment mentioned above, the present invention should not be limited to such slot machine, but may be applied to any slot machines which can display symbols.

Further, the sampling of a random number for the effective lines may be applied not only to a primary game but also to a secondary game.

Further, although it has been explained that nine in total of symbols can be observed through the windows 3L, 3C and 3R of the slot machine in the embodiments mentioned above, the present invention can also be applied to slot machines in which symbols by a number other than 9 may be observed.

Additionally, although it has been explained that a number of medals to be bet on a game does not relate to a number of effective lines, but only affects a dividend upon winning in any of the embodiments mentioned above, it is possible to determine a number of effective lines in accordance with a number of medals to be bet before the sampling of a random number for setting positions of the effective lines.

As mentioned above, according to the present invention, the player can hold interest for a game until the game is over.

Further, according to the present invention, it is possible to provide a slot machine which is fun in comparison with a conventional one, and with which the player can concentrate his attention on a game.

What is claimed is:

1. A game machine, comprising:

a reel observing window; and a plurality of reels located within said reel observing window, wherein the game machine determines a prize situation, depending upon a combination of symbols on the reels displayed on effective lines of the reel observing window, wherein positions of the effective lines are variable, and said positions are determined by sampling random number.

2. A game machine as set forth in claim 1, wherein said effective lines determined by said sampling of a random number are indicated by turning on light emitting means provided in association with said effective lines.

3. A game machine as set forth in claim 2, wherein said light emitting means are lamps.

4. A game machine as set forth in claim 2, wherein said effective lines are composed of EL lamps, and said effective lines determined by said sampling of a random number are indicated by emitting light therefrom.

5. A game machine as set forth in claim 1, said sampling of a random number is carried out for every game.

6. A game machine as set forth in claim 1 wherein a game starts with medals being betted and said number of effective lines are determined based on the number of medals to be betted.

7. A game machine comprising:

a reel observing window; and a plurality of reels located within said reel observing window, wherein said game machine determines a prize situation, depending upon a combination of symbols on the reels displayed on effective lines of the reel observing window, wherein a number of the effective lines is variable, and is determined by sampling a random number.

8. A game machine, comprising:

a reel observing window; and a plurality of reels located within said reel observing window, wherein said game machine determines a prize situation, depending upon a combination of symbols on the reels displayed on effective lines of the reel observing window, wherein positions and a number of the effective lines are variable, and are determined by sampling a random number.

9. A game machine, comprising:

a reel observing window; and a plurality of reels located within said reel observing window, wherein said game machine determines a prize situation depending upon a combination of symbols on the reels displayed on effective lines of the reel observing window, wherein positions of said effective lines are variable and the positions of the effective lines are determined by sampling a random number after the combination of symbols has been finalized in prize determination.

* * * * *